Feb. 4, 1964  C. T. BEALL  3,120,409
BELT DRIVE FOR TRACK TYPE TRACTOR
Filed April 23, 1962  3 Sheets-Sheet 1

INVENTOR.
CHARLES T. BEALL
BY
ATTORNEYS

Feb. 4, 1964　　　　C. T. BEALL　　　　3,120,409
BELT DRIVE FOR TRACK TYPE TRACTOR
Filed April 23, 1962　　　　　　　　　　3 Sheets-Sheet 2

INVENTOR.
CHARLES T. BEALL
BY
ATTORNEYS

Feb. 4, 1964 C. T. BEALL 3,120,409
BELT DRIVE FOR TRACK TYPE TRACTOR
Filed April 23, 1962 3 Sheets-Sheet 3

INVENTOR.
CHARLES T. BEALL
BY
ATTORNEYS

United States Patent Office 3,120,409
Patented Feb. 4, 1964

3,120,409
BELT DRIVE FOR TRACK TYPE TRACTOR
Charles T. Beall, 7200 Thorncrest Drive,
Grand Rapids, Mich.
Filed Apr. 23, 1962, Ser. No. 189,584
8 Claims. (Cl. 305—13)

This invention relates to belt drive mechanisms, and more particularly to a V-belt and sprocket combination.

Power transmission belts ordinarily are either of the friction drive type such as V-belts and flat belts, or alternatively the positive, sprocket drive type. V-belts usually have a relatively long life and have exceptional driving characteristics since the V projection can be squeezed tightly into the V groove. However, V-belts are subject to slippage under heavy pulls, or when subjected to shock loads, and especially when dirt becomes impacted into the V grooves or mud is forced between the belt and the grooves. The sprocket type, on the other hand, has a positive drive to prevent slippage even when heavy loads or shock loads occur. However, it ordinarily has a relatively short life due to rapid wear of the slots and teeth. This rapid wear occurs largely at the relatively small area of contact between the sprocket teeth and the front edge of the belt slots against which the teeth exert a force. The highly concentrated stresses quickly cause deformation and wear of the slot ends in a rapidly accelerating manner. Further, the teeth and slots must be carefully formed and machined to close tolerances to distribute the driving forces between a large number of the teeth and slots, and thereby prevent detrimental concentration of the entire driving force on a couple of teeth and slots.

It is an object of this invention to provide a V-belt and sprocket assembly which will have the long life and the good drive qualities of a V-belt, and yet will not slip even when subjected to heavy loads, to shock loads, or when used in mud, snow or the like.

It is another object to provide a novel V-belt and sprocket with long life and non-slip characteristics, and wherein the belt and sprocket do not require expensive close tolerances.

It is a further object to provide a V-belt and sprocket assembly adapted to cooperate to provide an optimum continuous surface V-type frictional drive connection, and which will also cooperate to provide a positive drive connection under adverse conditions such as heavy loads, shock loads, or where the frictional contact is substantially lessened. The positive drive connection is not subject to clogging by impacted dirt since the recesses in the belt pass the dirt to keep the belt constantly clean.

These and other objects of this invention will be apparent upon studying the following specification in conjunction with the drawings in which.

Basically, the novel V-belt and sprocket comprises a belt having a body portion with at least one and preferably a plurality of parallel generally V-shaped elongated beads or projections extending over the length thereof along one side of the body. A plurality of spaced recesses and intermediate teeth are provided adjacent the elongated V-projections. The V-projections extend inwardly beyond the body and teeth to form a continuous V element. The belt cooperates with a sprocket having continuous annular V-groove means therearound to tightly interfit with the V-projections on the belt and provide a frictional driving engagement. Adjacent the grooves on the sprocket is a plurality of radially projecting sprocket teeth of a width and length slightly smaller than the openings or recesses in the belt to readily and somewhat loosely interfit therein. The length of the sprocket teeth is less than the depth of the belt recesses to form a clearance therebetween. Likewise, the belt teeth are shorter than the depth of the sprocket cavities between the sprocket teeth to form a clearance therebetween. Thus, each continuous V-projection is capable of being tightly interengaged into each continuous V-groove to effect an optimum frictional driving engagement, without obstruction between the respective teeth and recesses.

Upon the occurrence of slippage between the frictional engagement, the front edges of the sprocket teeth contact the front edges of the belt recesses or openings and provide a positive drive connection to prevent substantial belt slippage. When the belt teeth and recesses are located in the central portions of the belt, the recesses are extended clear through the belt body so that they are constantly cleaned of dirt by the inserted sprocket teeth.

Figure 1:
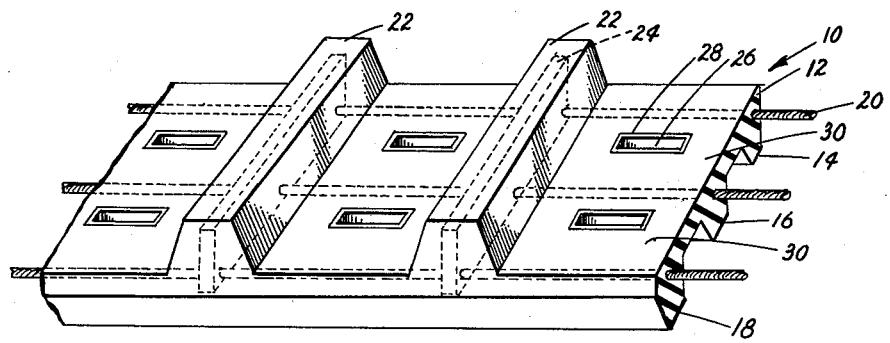
FIG. 1 is a fragmentary perspective view of a portion of one form of the novel V-belt showing its potential use as a tractor track.
Figure 5:
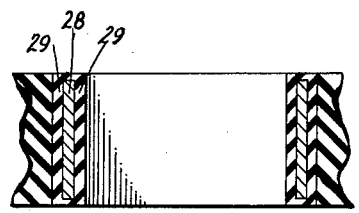
FIG. 5 is a fragmentary, enlarged sectional view of the sprocket receiving recesses of the first form of the belt showing the rubber coated liner.

Referring to the drawings, in FIG. 1, the first form of the inventive belt 10 is disclosed. Belt 10 includes a central body portion 12 having a plurality of generally V-shaped projections or beads 14, 16 and 18 which are generally parallel to each other and extend over the length of the belt. These bead projections extend inwardly beyond the body portion and the remaining portions of the belt to form continuous elements providing optimum frictional engagement.

Figure 6:
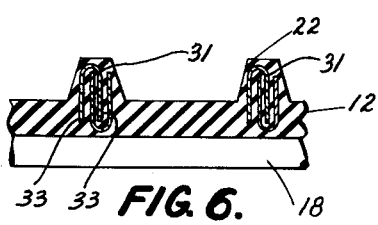
FIG. 6 is a sectional, elevational, fragmentary view of a slightly modified, track-type V-belt.
Figure 7:
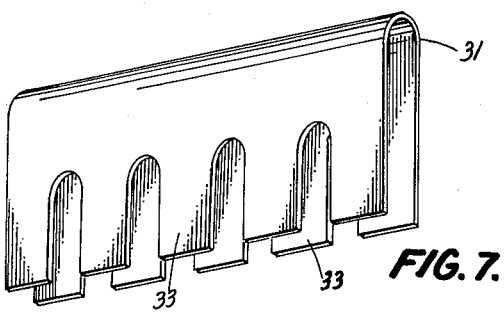
FIG. 7 is a perspective view of one of the reinforcing elements in the belt illustrated in FIG. 6.
Figure 12:
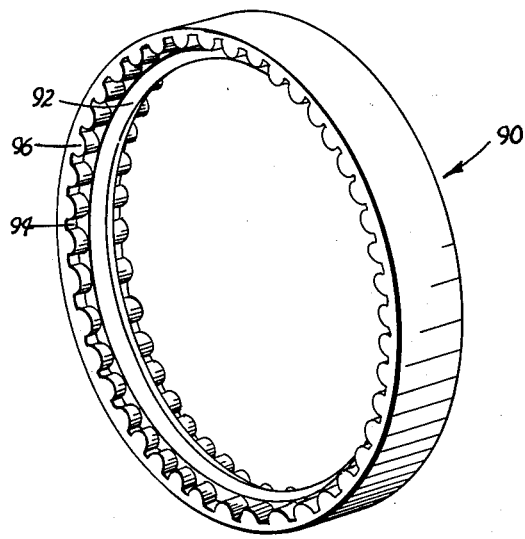
FIG. 12 is a perspective view of a third form of the novel V-belt.
Figure 13:
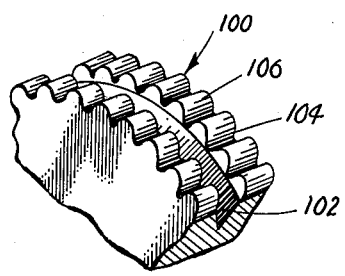
FIG. 13 is a fragmentary perspective view of a third form of the novel sprocket to interfit with the V-belt of FIG. 12.
Figure 14:
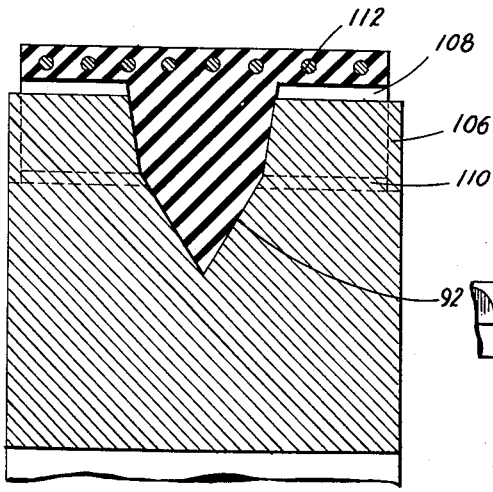
FIG. 14 is a fragmentary sectional end view of the third forms of V-belt and interfitting sprocket.
Figure 15:
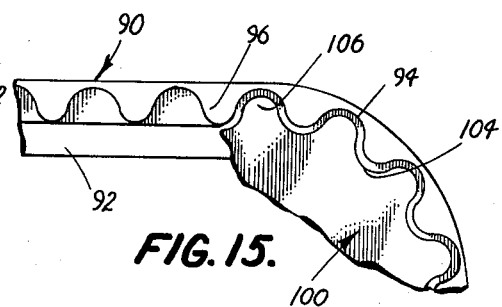
FIG. 15 is a fragmentary sectional side view of the third form of V-belt and interfitting sprocket.

A plurality of cable-type elements 20 may be utilized over the length of the belt to provide tensile strength, especially when used on a belt having external transverse cleats 22 enabling use of the belt as a tractor track. These cleats may include transverse plates 24 imbedded therein and secured to the cable elements 20 for added strength. Instead of the solid plates 24, it has been found to be advantageous in many instances to use a pair of interfitting U-shaped elements 31 as shown in FIGS. 6 and 7. The two elements when embedded in the body 12 of the belt are inverted with respect to each other so that the legs thereof interfit. The elements extend into the cleats to provide support, and may, if desired, extend somewhat into the V-projection 18. Each leg is preferably composed of a plurality of spaced fingers 33 to securely anchor the elements in place in the rubber belt. This structure, while lightweight, comprises an effective reinforcement for the cleats, allowing slight flexure under severe stresses to prevent belt damage and normally maintaining sturdy cleats. This structure may also utilize tension cables like those shown in FIG. 1.

Figure 2:
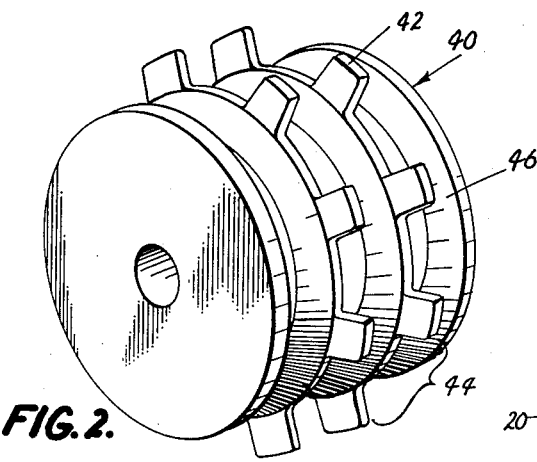
FIG. 2 is a perspective view of one form of the novel sprocket.
Figure 4:
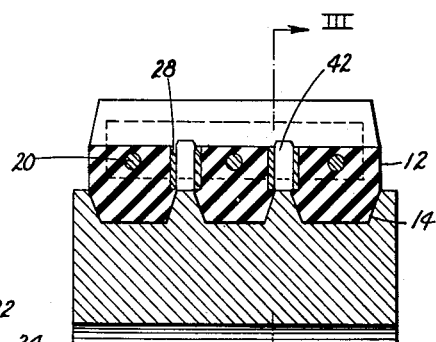
FIG. 4 is a sectional view of the first form of the sprocket and belt taken on plane IV—IV of FIG. 3.

Spaced laterally between the projections and longitudinally between the cleats, are a plurality of recesses 26 extending through the body of the belt. When these recesses are positioned other than adjacent the edges of the belt as in FIG. 1, i.e. in the central portions of the belt they extend clear through the body of the belt so that dirt will not become impacted therein. These openings are preferably lined by wire or cord elements 28 of cotton, nylon or other equivalent material coated with rubber to provide added wear resistance. Due to the rubber coating 29 of these metallic or fabric elements 28, they can be vulcanized into position in the belt and later replaced when worn. Adapted to cooperate with this belt is the sprocket 40 shown in FIG. 2. The sprocket includes a plurality of teeth 42 here shown in two rows. Adjacent the teeth and extending radially inwardly of the base of the cavities 44 between the teeth are V-groove means 46 adapted to cooperate with the V-projections on belt 10. The V-groove 46 may include openings in the base thereof to provide an outlet for foreign matter such as dirt.

Figure 3:
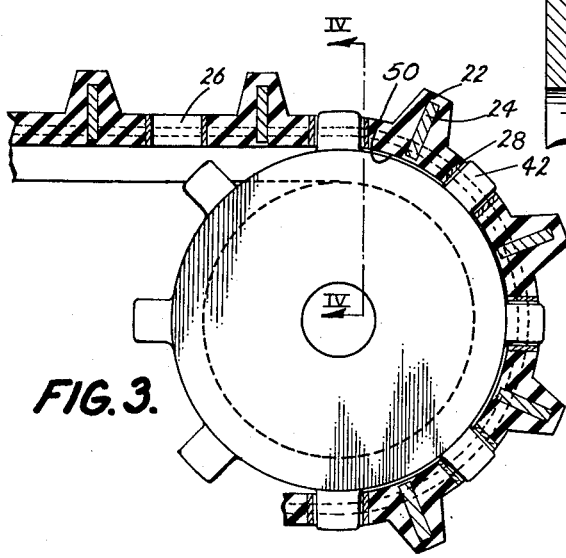
FIG. 3 is a sectional view of the first form of the sprocket and V-belt taken through one of the grooves of the sprocket on plane III—III of FIG. 4.

When the belt and sprocket are interfitted as shown in FIG. 3, the segments 30 of the belt forming shoulders between openings 26 act as belt teeth to interfit with the sprocket cavities 44 between the sprocket teeth 42. The depth of each sprocket cavity is greater than the depth of the respective belt tooth portion 30 so that a clearance 50 exists between them. Likewise, since the openings 26 pass clear through the belt body, there is no contact between the radial outer ends of the sprocket teeth 42 and the belt body. Thus, the V-projections can be tightly mashed into the V-grooves to provide an optimum frictional gripping relationship.

Under ordinary circumstances, the frictional engagement of the V-grooves and projections provide the major driving force for the assembly. Because of the tapered configuration of the sprocket teeth and the lateral clearance between the teeth and the openings, there is ordinarily little wear between the teeth and the opening. Only when the V-belt slips within the groove due to an extra heavy load, due to a shock load, or due to mud or the like which reduces the coefficient of friction, do the interengaging teeth and recesses effect a positive driving connection to prevent slippage.

Figure 8:
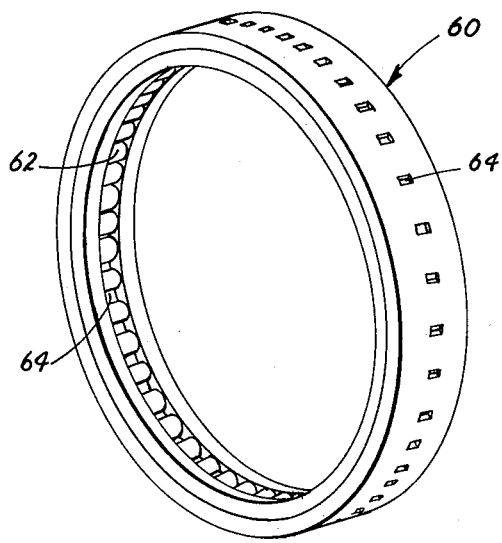
FIG. 8 is a perspective view of a second form of the novel V-belt.
Figure 9:
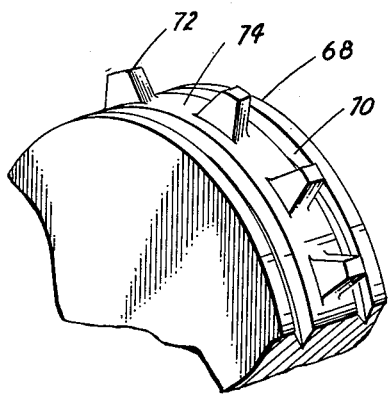
FIG. 9 is a fragmentary perspective view of a second form of the novel sprocket to cooperate with the belt illustrated in FIG. 8.
Figure 10:
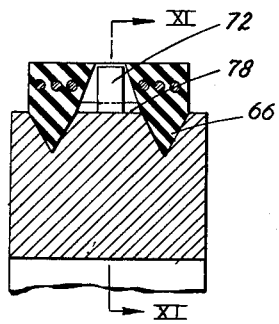
FIG. 10 is a fragmentary sectional end view of the interfitting belt and sprocket of FIGS. 8 and 9.
Figure 11:
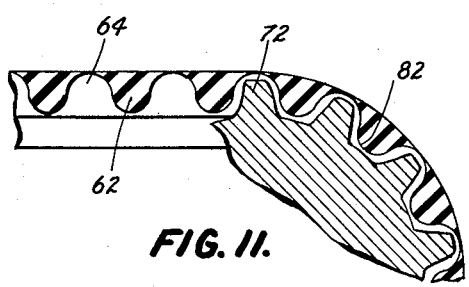
FIG. 11 is a fragmentary, sectional side view of the belt and sprocket of FIGS. 8 and 9 and taken on plane XI—XI of FIG. 10.

In the second form of the novel belt 60 shown in FIG. 8 the plurality of belt teeth 62 are more pronounced between the spaced belt recesses 64 which again are openings passing clear through the body of the belt. Constant cleaning of dirt from the belt recesses occurs when the sprocket teeth project into the openings and push dirt out the opposite side. The V-projection means is shown in this form as two beads 66, commencing adjacent the ends of belt teeth 62 and projecting radially inwardly beyond the belt body and teeth 62 to form continuous frictional engagement elements. This belt cooperates with sprocket elements. This belt cooperates with sprocket 68 shown in fragmentary form in FIG. 9. This sprocket 68 includes V-groove means 70 extending radially inwardly of the base of the sprocket teeth 72 and intermediate cavities 74. Thus, grooves 70 are also continuous to provide an optimum frictional engagement with the continuous V-projections 66 on the belt. When the sprocket and belt of the second form of the invention are interengaged as shown in FIGS. 10 and 11 and a clearance 78 exists between the body of the belt, i.e. the outer surfaces 82 of the teeth 62 and the sprocket, i.e. the bottom of the recesses 74. Also, there is normally no contact between the outer surfaces of the sprocket teeth 72 and the belt body due to the openings 64 in the belt. Therefore, the V-projections and grooves can be meshed tightly together to effect an optimum V-belt drive.

In the third form of the invention illustrated in FIGS. 12 through 15, the V-projection means on belt 90 comprises one bead 92 positioned centrally of the belt, with the plurality of belt recesses 94 and intermediate belt teeth 96 positioned on both sides thereof. Since the belt teeth 96 and recesses 94 are adjacent the edges of the belt in this form of the invention, the recesses need not be formed clear through the belt body as in the previous form of the invention, since the dirt will readily pass out the sides of the recesses to prevent compacting thereof in the recesses during use.

The V-projection means 92 extends inwardly beyond the belt body and teeth 96 to form a continuous element. In other words, the V-projection commences adjacent the ends of the belt teeth 96 and projects inwardly thereof to form a continuous element. When the third form of the belt 90 is engaged with the third form of the sprocket 100, illustrated in FIG. 13, so that the V-projection 92 interengages tightly with the V-groove 102 in the center of the sprocket, and so that the teeth 96 on the belt and adjacent recesses interengage respectively with the cavity 104 on the sprocket and the adjacent sprocket teeth 106, a clearance exists at 108 (FIG. 14) between the bottom of the recesses 94 and the sprocket teeth 106. This is caused by the fact that the sprocket teeth are substantially shorter in length than the depth of the belt recesses 94. Likewise, a clearance exists at 110 between the bottom of the sprocket recesses 104 and the outer ends of the belt teeth 96 to normally prevent binding contact. These clearances enable the V-projections 92 to be meshed tightly into the V-groove 102 to assure a continuous optimum frictional engagement. Reinforcing cables 112 or wires may be utilized as needed to provide the tensile strength required for the belt.

During the operation of each one of the forms of the invention, normally the major driving load occurs between the V-grooves and the V-projections. The interfitting teeth and recesses normally provide only a small fraction of the driving engagement to thus cause wear to be at a minimum. However, if a shock load is applied to the combination, or an extra heavy load, or if the coefficient of friction is reduced due to the presence of mud or snow, the V-belt will possibly slip, but the teeth and recesses will provide a positive driving relationship until the exceptional situation is alleviated.

It is realized that certain minor modifications may be made in the structure illustrated without departing from the spirit of the invention taught. Thus, the invention is not to be limited by the structure depicted but only by the scope of the appended claims and the reasonably equivalent structures thereto.

I claim:

1. A V-belt drive assembly comprising: sprocket means having at least one peripheral row of a plurality of teeth extending from the peripheral surface thereof and intermediate cavities between the teeth, and having annular continuous V-groove means formed into said peripheral surface transversely adjacent said row; a V-belt adapted to travel around said sprocket; said V-belt having continuous V-projection means adapted to tightly interfit with said V-groove means to provide frictional driving engagement therebetween, and having at least one peripheral row of a plurality of spaced teeth and intermediate recesses transversely adjacent said V-projection means and engaging with said sprocket cavities and teeth respectively; the length of said sprocket teeth being less than the depth of said belt recesses to form a clearance therebetween, whereby said interfitting V-projection means and V-grooves normally provide substantially all of the driving transmission and said interfitting teeth prevent slippage under exceptional conditions.

2. A V-belt drive assembly comprising: sprocket means having at least one peripheral row of a plurality of teeth extending from the peripheral surface thereof and intermediate cavities, and having annular V-groove means formed into said peripheral surface transversely adjacent said row; a V-belt adapted to travel around said sprocket; said V-belt having annular V-projection means tightly interfitting with said V-groove means to provide frictional driving engagement therebetween, and having a plurality of teeth and intermediate recesses interfitting with said sprocket cavities and teeth respectively; the length of said sprocket teeth being less than the depth of said belt recesses to form a clearance therebetween, and the length of said belt teeth being less than the depth of said sprocket cavities to form a clearance therebetween, whereby said interfitting V-projection means and V-groove means normally provide substantially all of the driving transmission, and said interfitting teeth prevent slippage under exceptional conditions.

3. A V-belt and sprocket combination comprising: a sprocket; a plurality of annular generally V-shaped, transversely spaced grooves formed into the periphery of said sprocket; a plurality of radially projecting sprocket teeth extending from the periphery of said sprocket, laterally between said grooves; an endless V-belt around said sprocket; said V-belt having a body portion, and a plurality of spaced, parallel, generally V-shaped beads extending over the length of one side of said body portion and adapted to tightly interengage with said sprocket grooves, and provide a frictional driving engagement therebetween; a plurality of openings in said V-belt extending completely through said body portion and positioned between said beads to allow said sprocket teeth to project therethrough; a plurality of shoulders between said openings; and a positive clearance between said shoulders and said sprocket teeth, whereby said interengaging grooves and beads normally effect the major driving transmission between said sprocket and V-belt, and said sprocket teeth and openings form a positive drive connection between said sprocket and V-belt upon the occurrence of slippage in said frictional driving engagement.

4. A V-belt and sprocket comprising: a V-belt having a body portion; said body portion including a plurality of spaced recesses and intermediate teeth; and a continuous V-projection means on said belt commencing generally adjacent the base of said body and the end surfaces of said teeth and projecting inwardly beyond said body and teeth; a sprocket including a plurality of teeth fitting within said spaced recesses, and intermediate cavities receiving said belt teeth; and said sprocket including continuous V-groove means extending inwardly of the bottoms of said cavities and receiving said continuous V-projection means.

5. A V-belt comprising: an elongated body; a plurality of generally V-shaped, parallel, elongated beads extending from one side of said body over the length of the belt to provide friction grip surfaces capable of cooperating with matching grooves; and a plurality of spaced openings positioned transversely between said beads and adapted to receive sprocket teeth, each opening extending completely through the body of said belt in order that dirt in said openings may be pushed therefrom by sprocket teeth engaging therewith.

6. A V-belt and sprocket assembly adapted for use on a track type tractor comprising: a sprocket; a plurality of annular generally V-shaped, spaced grooves formed into the sprocket peripheral surface around said sprocket; a plurality of radially projecting teeth extending from the periphery of said sprocket transversely between said grooves; an endless V-belt around said sprocket; said V-belt having a body portion, and a plurality of continuous spaced, parallel, generally V-shaped beads extending over the length of one side of said body portion to interengage with said grooves to provide a frictional driving engagement therebetween; a plurality of transverse traction cleats projecting from the side of said body opposite to said one side; and a plurality of spaced openings along the length of said V-belt, positioned laterally between said elongated beads and longitudinally between said cleats; each of said openings extending completely through the body of said V-belt and receiving a positive driving tooth of said sprocket projecting therethrough and forming a self-cleaning positive drive connection upon the occurrence of slippage between said beads and grooves.

7. A V-belt adapted for use as a tractor track comprising: an elongated body portion; a plurality of generally V-shaped, parallel, elongated beads extending from one side of said body over the length of said belt to provide friction grip surfaces capable of cooperating with matching grooves; a plurality of transverse traction cleats projecting from the side of said body opposite to said one side; a plurality of spaced openings along the length of said belt, positioned laterally between said elongated beads and longitudinally between said cleats; each of said openings extending completely through the body of said belt to allow a positive driving lug to project therethrough and form a self-cleaning, positive drive connection upon the occurrence of slippage between said beads and grooves.

8. A rubber V-belt comprising: a body portion; V-projection means on one side of said body portion; a plurality of openings through said body adapted to interfit with sprocket teeth; a metallic liner in each of said openings; and each of said liners having a rubber coating vulcanized to said rubber belt to secure said liners in position.

References Cited in the file of this patent

UNITED STATES PATENTS

| | | |
|---|---|---|
| 354,849 | Barnes | Dec. 21, 1886 |
| 1,196,937 | Evans | Sept. 5, 1916 |
| 2,040,696 | Johnston | May 12, 1936 |
| 2,472,513 | Bergquist | June 7, 1949 |
| 2,770,977 | Beckadolph et al. | Nov. 20, 1956 |

FOREIGN PATENTS

| | | |
|---|---|---|
| 1,013,382 | France | Apr. 20, 1952 |
| 1,055,157 | France | Oct. 14, 1953 |